United States Patent [19]
Burmester et al.

[11] 3,938,574
[45] Feb. 17, 1976

[54] VULCANIZABLE RUBBER MIXTURE FOR TIRE TREADS HAVING IMPROVED SKID RESISTANCE

[75] Inventors: Kurt Burmester, Overath-Steinenbruck; Siegfried Wolff, Bornheim-Merten; Erhard Klotzer, Putzbrunn-Solalinden; Friedrich Thurn, Rodenkirchen, all of Germany

[73] Assignee: Deutsche Gold- und Silber-Scheideanstalt vormals Roessler, Germany

[22] Filed: Nov. 21, 1974

[21] Appl. No.: 526,063

Related U.S. Application Data

[63] Continuation-in-part of Ser. No. 514,318, Oct. 11, 1974, abandoned.

[30] Foreign Application Priority Data

Oct. 11, 1973 Austria .............................. 8692/73

[52] U.S. Cl. ............. 152/330 R; 152/209 R; 260/5; 260/33.6 AQ; 260/42.15; 260/42.37; 260/448.8 R; 260/894
[51] Int. Cl.². B60C 5/00; B60C 11/14; C08K 5/01; C08L 7/00
[58] Field of Search ......... 260/5, 33.6 AQ, 448.8 R, 260/894, 42.37, 42.15; 152/330 R, 209 R

[56] References Cited
UNITED STATES PATENTS 3,801,537 4/1974 Westlinning et al. ............ 260/42.33
3,842,111 10/1974 Meyer-Simon et al. ....... 260/448.2 E

FOREIGN PATENTS OR APPLICATIONS 1,010,215 11/1965 United Kingdom
1,167,677 4/1964 Germany
1,470,775 1/1969 Germany
1,620,758 4/1970 Germany

OTHER PUBLICATIONS

Morton – Rubber Technology (2nd ed.) (Van Nostrand) (N.Y.) (July 12, 1973), pp. 46, 49, & 207–208.

*Primary Examiner*—Donald E. Czaja
*Assistant Examiner*—H. H. Fletcher
*Attorney, Agent, or Firm*—Cushman, Darby & Cushman

[57] ABSTRACT

A vulcanizable rubber mixture for tire treads containing a rubber, preferably vulcanizable with sulfur, silica filler, plasticizer oil, a sulfur containing organosilane, sulfur and an accelerator comprising one or two polybutadiene rubbers in an amount of 20 to 100 weight % of the total elastomer, one or two rubbers other than a polybutadiene of the group consisting of synthetic rubber and natural rubber in an amount of 80 to 0 weight % of the total elastomer, plasticizer oil in an amount of 40 to 100 parts by weight per 100 parts by weight of rubber, at least one bis-[alkoxysilylalkyl]-oligosulfide in an amount of 0.1 to 25 parts by weight per 100 parts by weight of rubber, sulfur and/or sulfur donors in an amount of about 0.2 to 8 parts by weight per 100 parts by weight of rubber, and at least one vulcanization accelerator in an amount of about 0.1 to 8 parts by weight per 100 parts by weight of rubber, as well as in a given case other customary ingredients in the usual amounts employed in the tire industry, e.g., anti-agers, dyes, pigments, adhesive additives, activators and waxes. The preferred vulcanization accelerators are sulfur containing triazines disclosed in Westlinning U.S. Pat. No. 3,801,537.

*at least one active silica filler in certain amounts

23 Claims, No Drawings

VULCANIZABLE RUBBER MIXTURE FOR TIRE TREADS HAVING IMPROVED SKID RESISTANCE

This application is a continuation-in-part of our application Ser. No. 514,318, filed Oct. 11, 1974 and now abandoned.

The present invention is directed to special vulcanizable rubber mixtures used in the production of tire treads which are designed for vehicle tires with marked skid resistance on wet, snow covered, and, especially, icy streets.

Most automobile tires used at the present time for the prevention of skids and slipping by vehicles on streets covered with ice or dangerously packed snow are winter tires having hard steel studs, the so-called studded tires.

The use of the studded tires, especially the large number of motor vehicles provided with studded tires has substantial disadvantages. There arise large and widely broadened street surface damage by formation of flanged grooves with new dangers, as for example, the known aquaplaning. Besides the studded tires have industrial travel disadvantages. They cause increased braking distance and have an unfavorable curve stability. Also, the prescribed speed limits for vehicles for the reduction of road surface damage, which vehicles are equipped with studded tires either do not eliminate the exhibited disadvantages or do not reduce them substantially. The use of studded tires in the warmer times of the year besides is not only useless, but also brings with it dangers for the vehicle and passenger and causes the depicted road surface injury.

There have been numerous attempts for the improvement of the adhesion of tires to wet streets, to ice and packed snow and to increase the abrasion coefficient of the tire tread surface. It is close to the problem to loosen ice by producing a mechanical effect on ice. Thus for example coarse foreign particles are worked into the tread surface mixture. For example, there are used small stones, cement particles, walnut shells, hard rubber, steel chips or steel wool, etc. These precautions, however, use only a little or not at all or even lead partially to a deterioration of, the tire tread properties.

Also, there has been tried increasing the adhesion of tires to icy streets through the composition of the mixture of the tread, however, there cannot be produced decisive or desired improvement, the rut safety of the studded tires on icy streets until now either could not be attained or nearly attained. Furthermore, there also remained the important problem of solving how to prepare a vehicle tire which is rut safe in winter time as well as in transition times, especially on ice and snow covered streets.

Also, it is known to prepare a tire tread from a vulcanizable rubber mixture consisting of a rubber, a finely divided reinforcing silica pigment and a coupling agent (German Offenlegungsschrift No. 2,062,883) and the similar Hess U.S. Pat. No. 3,768,537. In Hess and the Offenlegungsschrift, the general formula exceedingly numerous coupling agents are listed, but only a few individual coupling agents are named which are silanes containing sulfur in the molecule. The mercaptopropyltrimethoxysilane and the corresponding triethoxy silanes tested in the examples of the Offenlegungsschrift and Hess are apparently the only silanes tried in practice. The rubber mixtures serving for the production of the treads besides the coupling agent and the silica pigment have no specific constituents and ratios. As advantageous properties of the disclosed tread mixtures in contrast to the known state of the art there were mentioned shortened cure time and improvements in regard to viscosity, the modulus values, compression set and particularly hysteresis or the heat build up, and tear strength.

Surprisingly, there has now been discovered a tire tread mixture and a tire tread produced therefrom or a tire provided with such a tire tread surface which has a skid safety equal to that of a studded tire having at the same time customary steel stud projections of 1.2 mm and which even exceeds the studded tire in several properties.

The new vulcanizable rubber mixture for tire treads contains a rubber, preferably vulcanizable with sulfur, silica filler, plasticizer oil, a sulfur containing organosilane, sulfur and an accelerator comprises one or two polybutadiene rubbers in an amount of 20 to 100 weight % of the total elastomer, one or two rubbers other than a polybutadiene of the group consisting of synthetic rubber and natural rubber in an amount of 80 to 0 weight % of the total elastomer, at least one active silica filler in certain amounts plasticizer oil in an amount of 40 to 100 parts by weight per 100 parts by weight of rubber at least one bis-[alkoxysilylalkyl]-oligo-sulfide in an amount of 0.1 to 25 parts by weight per 100 parts by weight of rubber, sulfur and/or sulfur donors in an amount of about 0.2 to 8 parts by weight per 100 parts by weight of rubber, and at least one vulcanization accelerator in an amount of about 0.1 to 8 parts by weight per 100 parts by weight or rubber, as well as in a given case other customary ingredients in the usual amounts employed in the tire industry, e.g., anti-agers, dyes, pigments, adhesive additives, activators and waxes. In a given case the mixture can contain reinforcing black in an amount of 0.1 to 50 parts by weight per 100 parts by weight of rubber.

The rubber mixture of the invention contrary to all expectations, has, surprisingly, in spite of the extraordinarily high amount of filler such a low viscosity that it is easily worked and especially is extrudable and therefore because of its properties can be used in the customary industrial machinery employed today in tire factories. It is just as surprising that the mixture in spite of the very high proportion of filler and additionally high amount of plasticizer oil can be so vulcanized with success that the vulcanizate has the necessary properties in regard to tear resistance, tearing strength and the like without the need for carbon black being present, and the treads or tires produced from the new mixture in spite of the unusual composition of the mixture display an excellent and unexpected favorable behavior on wet, ice-covered and/or snow smooth streets.

These outstanding properties can only be produced by the use of oligosulfidic silanes. Essential constituents of the rubber mixture are silanes of the general formula:

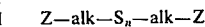

in which Z is:

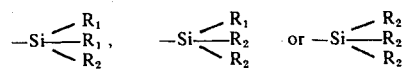

and in which $R_1$ is an alkyl group of 1 to 4 carbon atoms, a cycloalkyl group with 5 to 8 carbon atoms or phenyl and $R_2$ is an alkoxy group with 1 to 8, preferably 1 to 4, carbon atoms, a cycloalkoxy group with 5 to 8 carbon atoms. All the $R_1$ and $R_2$ groups can be the same or different. Alk is a divalent hydrocarbon group with 1 to 8 carbon atoms. It can be a straight or branched chain. Preferably alk has 2 to 4 carbon atoms and n is a number of 2 to 6, preferably 2 to 4. Alk can also be an unsaturated or cyclic hydrocarbon group.

The bis-[alkoxysilylalkyl]-oligosulfides can be made according to Belgian Pat. No. 787,691 and corresponding Meyer-Simon U.S. application 277,043, filed Aug. 1, 1972, now U.S. Pat. No. 3,842,111. The entire disclosures of the Belgian patent and the Meyer-Simon U.S. application are hereby incorporated by reference and relied upon as is the disclosure of Thurn U.S. application 415,176 filed Nov. 12, 1973 now U.S. Pat. No. 3,873,489 and which is a continuation-in-part of said Meyer-Simon application. German Offenlegungsschrift P 2255577 has a disclosure similar to Thurn.

Examples of such oligosulfide compounds useful in the invention include 3,3'-bis(trimethoxysilylpropyl)-disulfide, 3,3'-bis(triethoxysilylpropyl)tetrasulfide, 3,3'-bis(trimethoxy-silylpropyl) tetrasulfide, 2,2'-bis(-triethoxysilylethyl) tetrasulfide, 3,3'-bis(trimethoxysilylpropyl)trisulfide, 3,3'-bis(tributoxysilylpropyl) disulfide, 3,3'-bis(trimethoxy-silylpropyl)hexasulfide, 3,3'-bis(trioctoxysilylpropyl) tetrasulfide, 3,3'-bis(-trihexoxysilylpropyl) disulfide, 3,3'-bis(tri-2'''-ethylhexoxysilylpropyl)trisulfide, 3,3'-bis(triisooctoxy-silylpropyl)tetrasulfide, 3,3'-bis(tri-t-butoxysilylpropyl) disulfide, 2,2'-bis(methoxy diethoxy silyl ethyl)tetrasulfide, 2,2'-bis(tripropoxysilylethyl)pentasulfide, 3,3'-bis(tricyclo-hexoxysilylpropyl)tetrasulfide, 3,3'-bis(-tricyclopentoxysilylpropyl)trisulfide, 2,2'-bis(tri-2''-methylcyclohexoxysilylethyl)-tetrasulfide, bis(trimethoxysilylmethyl)tetrasulfide, 3-methoxy ethoxy propoxy silyl, 3'-diethoxybutoxysilylpropyl-tetrasulfide, 2,2'-bis(dimethylmethoxysilylethyl)disulfide, 2,2'-bis(dimethyl sec. butoxy-silylethyl)trisulfide, 3,3'-bis(methyl butylethoxysilylpropyl) tetrasulfide, 3,3'-bis(di-t-butylmethoxysilylpropyl)tetrasulfide, 2,2'-bis(-phenyl methyl methoxysilyethyl)trisulfide, 3,3'-bis(-diphenyl isopropoxysilylpropyl)tetrasulfide, 3,3'-bis(-diphenyl cyclohex-oxysilylpropyl)disulfide, 3,3'-bis-(diethoxymethylsilyl-propyl)tetrasulfide, 2,2'-bis(-methyl dimethoxysilylethyl) trisulfide, 2,2'-bis(methyl ethoxypropoxysilylethyl)tetra-sulfide, 3,3'-bis(diethyl methoxysilylpropyl)tetrasulfide, 3,3'-bis(ethyl di-sec. butoxysilylpropyl)disulfide, 3,3'-bis(propyl diethoxysilylpropyl)disulfide, 3,3'-bis(butyl dimethoxysilylpropyl) trisulfide, 3,3'-bis(phenyl dimethoxy-silylpropyl)tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl)-tetrasulfide, 3,3'-bis-(diethoxyphenylsilyl-propyl)tetrasulfide, 4,4'-bis(trimethoxysilyl-buten-2-yl)tetrasulfide, 4,4'-bis(trimethoxy-silylcyclohexylene)tetrasulfide, 5,5'-bis(dimethoxymethyl-silylpentyl)trisulfide, 3,3'-bis(trimethoxysilyl-2-methyl propyl)tetrasulfide, 3,3'-bis(dimethoxyphenylsilyl-2-methylpropyl) disulfide.

In regard to their sulfur contents the silanes which can be used can deviate from the stoichiometrically calculated content so that n in general formula I can be fractional or whole numbers, for example or preferably between 2.8 and 4.2.

The polymer component which must be present in the new rubber mixture is a polybutadiene rubber (BR), or a mixture of two polybutadienes. In most cases, it is necessary to add one or two additional types of rubbers as components of the mixture. For this purpose rubbers with the lowest possible glass point are especially well suited. In this sense, there are preferably mentioned natural rubber (NR), synthetic rubbers on the basis of isoprene (IR) (i.e., polyisoprene such as cis-polyisoprene) and trans-polypentenamer). Furthermore, there are suited rubbers from butadiene and styrene (SBR), especially copolymerizates of so-called "Low-Mooney" quality, which are SBRtypes with low Mooney-viscosities (See DIN German Industry Standard 53523, ASTM d 1646–62 or BS British Standard 1673:3:1951) which are obtainable in commerce and are characterized as such, nitrile rubber (butadiene-acrylonitrile copolymer), butyl rubber, halogenated butyl rubber such as chlorinated butyl rubber or brominated butyl rubber, ethylene-propylene-non-conjugated diene or polyene terpolymers, e.g., ethylene-propylene-cyclooctadiene terpolymer, ethylene-propylene-norbornadiene terpolymer, ethylene-propylene-dicyclopentadiene terpolymer and ethylene-propylene-cyclododecatriene terpolymer and the like synthetic rubbers which advantageously are vulcanizable with sulfur. Of the BR-type rubbers there are added especially those of middle molecular weight, preferred are those with a high cis-1,4-content, e.g. 30 to 99% cis.

Preferably, there are included two types of rubbers in the new rubber mixtures, for example, BR and SBR or BR and NR, or BR and IR. The amount of BR is 20 to 100 weight percent, especially 30 to 90, preferably 50 to 85 weight percent of the elastomer component in the rubber mixture; the remaining elastomer component in the amount of 80 to 0 weight percent can be another type of rubber, either a synthetic rubber other than BR or it can be natural rubber.

The selection of active fillers and their amount is of especial importance. Foremost of the fillers are the silicas known to be used in the rubber processing industry, preferably an active or reinforcing silica, in highly dispersed form, which for the greatest part or essentially consist of silicon dioxide. Especially useful are precipitated silicas of high purity and activity with BET-surface areas between 50 and 300 $m^2/g$ and average primary particle sizes over about 10 millimicrons. Additional silica fillers which can be used are the known pyrogenically produced silicates. Mixtures of silica-fillers can also be employed with advantage. In case the silica filler is the only type of filler present in the mixture, must be added in an amount of more than 40 parts by weight preferably more than 80 parts per 100 parts by weight of rubber in order to guarantee the desired good wet skid resistance of the finished tire in spite of the high proportion of polybutadiene in the mixture. The amounts of silica filler in the mixture are preferably larger than the amounts of carbon black customary until now in tire treads whereby in and of itself the processing of the rubber mixture for example in regard to the viscosity no longer would be possible and also the industrial value levels of the vulcanizate (tensile strength, tear resistance, etc.) would not be attained if a bis(alkoxysilylalkyl)oligo-sulfide were not present in the rubber mixture. The upper limit of the silica component can vary according to the desired properties of the mixture and vulcanizate, they can be fixed by one skilled in the art. Suitably the amount of filler can be in the range between 40 and 200 parts, preferably between 80 and 130 parts by weight, still more preferably between above 90 and 120 parts by weight per 100 parts by weight of rubber.

It has been found suitable in many cases to previously mix well the oligosulfidic silane with a portion of the activated silica, for example, in equal parts by weight and then to add this silane-silica to the remaining constituents of the rubber mixture. The silica and silane can be admixed in the manner disclosed in the aforementioned Thurn application 415,176. The oligosulfidic silane can also be admixed with the rubber and the plasticizer oil.

It can be especially advantageous if activators are added to the rubber mixture. Among such are basic activators or also materials designated as fillers-activators, for example diphenyl guanidine, hexamethylene tetramine, o-tolyl guanidine, triethanolamine, cyclohexyl amine, diethylene glycol and other appropriate known guanidines, amines or polyvalent alcohols. The amounts of these basic activators to be used depending on the amount of filler are chosen to be between 0.2 and 8 parts by weight per 100 parts of the white filler.

In a desired case, for example, for the purpose of coloring there can also be added carbon black into the rubber mixture of the invention. It is generally worked into the mixture in amounts between about 0.1 and 50 parts by weight per 100 parts by weight of rubber, in a given case in even smaller amounts. There can be used any of the types of carbon black, especially those customarily employed in the rubber industry for treads. For example, there may be mentioned HAF-blacks and especially ISAF blacks.*

*In case a carbon black is present in the mixture, the quantities of the silica filler mentioned above may be lowered to 20 parts by weight per 100 parts by weight of rubber.

The plasticizer oil is an important component of the new rubber mixture, as is also the proportion of plasticizer oil in the mixture. The amount should be in the range of about 40 to about 100 parts by weight per 100 parts by weight of rubber, preferably between 50 and 80 parts by weight per 100 parts of rubber. Preferably, plasticizer oils, which is also designated as process oils, added are of the naphthenic oil type. Especially advantageous are plasticizer oils having a setting point between 0° and −60°C., preferably between −10° and −55°C. There can also be added plasticizer oils of highly aromatic nature, in a given case also those which are of aromatic nature. There can also be added with advantage mixtures of different plasticizer oils. The plasticizer oils of processing oils are as a rule petroleum fractions, which in a given case can be still further modified chemically. Such oils are hydrocarbon in nature.

The bis-(alkoxysilylalkyl)oligosulfide is generally worked into the rubber mixture in amounts of 0.1 to 25 parts by weight, preferably in amounts of 0.1 to 15 parts by weight, per 100 parts by weight or rubber.

As adhesive additives there are understood known materials or mixtures which during the vulcanization cause a good binding of the rubber mixture to the materials used in the tire production such as metals or textiles, e.g., polyesters, such as polyethylene terephthalate, as well as, for example, steel cords, textile fiber cords, glass cords, bead cords and the like which are added in customary amounts.

The new rubber mixtures preferably contain sulfur for vulcanization, in a given case sulfur donors as well as the known N,N'-dithiobis-hexahydro-2H-azepinone-(2) and 2-benz-thiozyldithio N-morpholide, both together calculated in customary amounts of about 0.2 to about 5 parts by weight per 100 parts by weight or rubber, as well as at least one vulcanization accelerator, likewise in the customary amounts of about 0.1 to 8 parts by weight per 100 parts by weight of rubber. For special purposes the vulcanization can also be carried out with peroxides, for example, dicumyl peroxide.

There are special advantages according to the invention if there are added as accelerators in the sulfur vulcanization sulfur containing triazines which are described in German patent application P 1669954 (corresponding to French Pat. No. 1,564,112 or British Pat. No. 1,201,862) or Westlinning U.S. Pat. No. 3,801,537. The entire disclosure of the Westlinning U.S. patent is hereby incorporated by reference and relied upon. An example is bis-(2-ethylamino-4-diethylamino-triazinyl-6)-disulfide, in a given case in combination with other known accelerators, as for example, diphenyl guanidine.

Thus the triazine group containing accelerators have the formula:

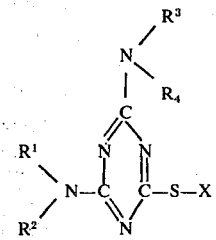

wherein $R^1$ and $R^3$ are each selected from the group consisting of hydrogen, alkyl, alkenyl, cycloalkyl, phenyl, aralkyl and substituted alkyl, alkenyl, cycloalkyl, phenyl and, aralkyl wherein the substituents are selected from the group consisting of —OH, —OR and —CN, R being alkyl with up to 18 carbon atoms, $R^2$ and $R^4$ are each selected from the group consisting of hydrogen, alkyl, alkenyl, cycloalkyl, phenyl, aralkyl and substituted alkyl, alkenyl, cycloalkyl, phenyl and aralkyl wherein the substituents are selected from the group consisting of —OH, —OR and —CN, R being alkyl with up to 18 carbon atoms, X is selected from the group consisting of hydrogen,

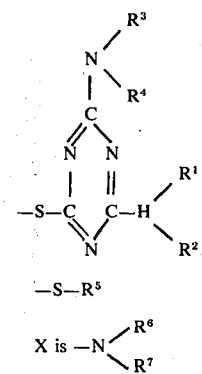

$R^6$ being selected from the group consisting of hydrogen, alkyl, aralkyl and cycloalkyl and $R^7$ being selected from the group consisting of alkyl, aralkyl and cycloalkyl and wherein $R^6$ and $R^7$ together may also form a cycloaliphatic ring having from 5 to 7 carbon atoms in the ring and from 5 to 10 carbon atoms, including lower alkyl, attached to the ring or wherein $R^6$ and $R^7$ may be linked by a member of the group consisting of —O—, —S— and

and wherein the number of carbon atoms in $R^1$, $R^2$, $R^3$, $R^4$, $R^6$, and $R^7$ is as follows:

| | |
|---|---|
| alkyl | up to 18 carbon atoms |
| alkenyl | up to 6 carbon atoms |
| cycloalkyl | from 5 to 7 carbon atoms |
| aralkyl | from 7 to 9 carbon atoms |

Thus there can be used 2-ethylamino-4-diethylamino-6-mercapto triazine and other mono mercapto triazines of formula II where X is hydrogen such as those in the following Table 1.

Also there can be used bis triazines containing disulfide linkages such as bis-(2-diethylamino-4-anilido) triazine, 2,4-bis-ethylamino-6-n-butyldithio-triazine, 2,4-bis-diethylamino-6-benzyl-dithio-triazine, 2,4-bis-diethyl-amino-6-(benzothiazol-2-yl-dithio)-triazine and other ditriazines of formula III such as those in Table 2.

Other suitable triazines include 2,4-bis-diethylamino-6-cyclohexyl-sulfenamido-triazine and similar triazines of formula IV as set forth in Table 3.

There can be employed any of the triazines set forth in Westlinning U.S. Pat. No. 3,801,537, column 7, line 46 to column 8, line 50.

TABLE 1

| $R_1$ | $R_2$ | $R_3$ | $R_4$ |
|---|---|---|---|
| H | $CH_3$ | H | $C_3H_7$-i |
| H | $C_2H_5$ | H | $C_3H_7$-i |
| H | $C_2H_5$ | $C_2H_5$ | $C_2H_5$ |
| H | $C_3H_5$ | H | $C_3H_5$ |
| H | $C_3H_7$-i | H | $CH_2CH_2OH$ |
| H | $C_6H_5$ | H | $C_6H_5$ |
| $CH_3$ | $C_6H_5$ | $CH_3$ | $C_6H_5$ |
| $C_2H_5$ | $C_2H_5$ | $C_2H_5$ | $C_2H_5$ |
| H | $CH_2CH_2OH$ | H | $CH_2CH_2OH$ |
| $CH_2CH_2OH$ | $CH_2CH_2OH$ | $CH_2CH_2OH$ | $CH_2CH_2OH$ |
| H | $C_6H_5$ | $C_2H_5$ | $C_2H_5$ |
| H | $C_{18}H_{37}$ | H | $C_{18}H_{39}$ |
| H | $C_2H_5$ | H | $C_4H_9$ |
| $CH_3$ | $CH_3$ | H | $C_2H_5$ |
| H | $C_4H_9$-n | H | $C_4H_9$-n |
| $C_2H_5$ | $C_2H_5$ | H | $C_4H_9$-i |
| H | $C_3H_5$ | H | $C_4H_9$-n |
| $C_6H_{11}$ | $C_6H_{11}$ | H | $C_2H_5$ |
| H | $CH_3$ | H | $CH_2CH_2CH_2OCH_3$ |
| $C_3H_5$ | $C_2H_5$ | H | $CH_2CH=CH_2$ |
| H | $C_2H_5$ | H | $CH_2C_6H_5$ |
| H | $C_2H_5$ | H | $CH_2CN$ |
| H | $CH_2CH_2CN$ | H | $CH_2CH_2CN$ |
| $C_2H_5$ | $C_2H_5$ | H | $(CH_2)_2OCH_3$ |
| $C_3H_7$ | $C_3H_7$ | H | $(CH_2)_2OCH_3$ |
| H | $C_6H_{11}$ | H | $C_6H_{11}$ |
| H | $C_6H_{11}$ | H | H |
| H | $C_6H_{11}$ | $C_6H_{11}$ | $C_6H_{11}$ |
| H | $C_2H_5$ | H | 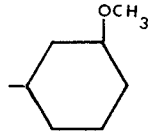 |

Formula III:

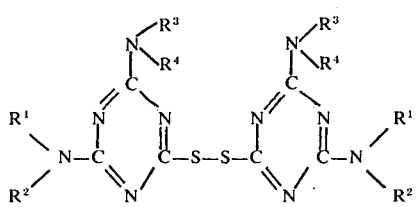

TABLE 2

| $R^1$ | $R^2$ | $R^3$ | $R^4$ |
|---|---|---|---|
| $C_4H_9$-n | $C_4H_9$-n | H | $C_2H_5$ |
| $C_2H_5$ | $C_2H_5$ | H | $C_2H_5$ |
| $C_2H_5$ | $C_2H_5$ | $C_2H_5$ | $C_2H_5$ |
| $C_2H_5$ | H | H | $C_4H_9$-i |

Formula IV:

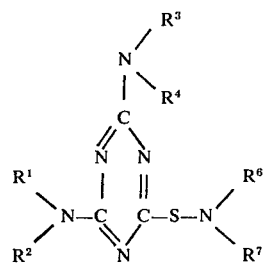

TABLE 3

| | |
|---|---|
| I | $N{<}^{R^6}_{R^7}$ |
| I | $N(C_2H_5)_2$ |
| I | $NH{-}C_6H_{11}$ |
| I | $N{<}^{C_6H_{11}}_{C_6H_{11}}$ |
| I | (morpholine ring: N H O) |
| I | (piperidine ring: N H) |
| II | $NH{-}CH_2{-}C_6H_5$ |

Preferably there are also used in the mixture of the invention an organic acid, as for example stearic acid, benzoic acid or salicylic acid, as well as in a given case zinc oxide or lead oxide in customary amounts. It is also advantageous to incorporate into the mixtures of the invention known assistants such as stabilizers against oxidative influences and fatigue inhibitors as well as anti-agers and/or ozone stabilizers in the customary amounts. In a given case there can be added to the mixture other known additives in the rubber processing industry such as pigments, dyes, other known filler-adhesive improvers, waxes, activators and the like in customary amounts.

The production of the rubber mixtures as well as the shaping, e.g., by injection and the vulcanization take place according to the customary procedures and with the help of known apparatuses which are customary in the rubber industry.

The invention also includes the mixing process. This process for the production of vulcanizable rubber mixtures for tire treads based on rubbers preferably cross-linkable with sulfur, silica-filler, plasticizer oil, sulfur containing organosilane, sulfur and accelerater is characterized in that there are mixed to homogeneous distribution one, or in a given case, two polybutadiene rubbers in an amount of 20 to 100 weight percent of the elastomer component, one or two rubbers other than polybutadiene from the group consisting of synthetic rubbers and natural rubbers in an amount of 80 to 0 weight percent of the elastomer component in the rubber mixture, activated silicafiller in an amount of more than 80 parts by weight per 100 parts by weight of rubber, plasticizer oil in an amount of 40 to 100 parts by weight per 100 parts by weight of rubber, at least one bis(alkoxy-silylalkyl)oligosulfide in an amount of 0.1 to 25 parts by weight per 100 parts by weight of rubber, sulfur, as well as in a given case sulfur donors together in an amount of 0.2 to 8 parts by weight per 100 parts of rubber and at least one vulcanization accelerater in an amount of about 0.1 to 8 parts by weight per 100 parts by weight of rubber as well as in a given case additional additives in the tire industry in the customary amounts such as anti-agers, fatigue inhibitors, ozone stabilizers, antioxidants, dyes, pigments, adhesive additives, activators and waxes.

The mixing itself is advantageously carried out in a kneader according to the so-called "Upside-Down-Process." The subsequent processing of the rubber mixture suitably takes place by injection with help of known injection apparatus.

The subsequent shaping and vulcanization can be carried out in the range of between about 100°C. and about 300°C., preferably at 130°C. to 240°C. For this purpose the usual vulcanization apparatus employed in the tire industry is employed.

Unless otherwise indicated, all parts and percentages are by weight.

EXAMPLE 1

Two mixtures according to the invention had the following compositions.

|  | Mixture 1 Parts | Mixture 2 Parts |
|---|---|---|
| Low-Mooney-styrene-butadiene-rubber (Mooney-viscosity 30) | 30.0 | 30.0 |
| Polybutadiene-rubber with a 98 % cis-1,4 content | 70.0 | 70.0 |
| Precipitated active silica having a specific surface area measured according to BET of 130 m²/g and an average primary particle size of 28 millimicrons (Ultrasil VN2 of Degussa) | 95.0 | 114.0 |
| Bis-(3,3'-triethoxysilylpropyl)-tetrasulfide | 5.0 | 6.0 |
| Zinc oxide | 3.0 | 3.0 |
| Stearic acid | 1.0 | 1.0 |
| Highly aromatic hydrocarbon plasticizer oil (setting point) ± 0°C) | 48.0 | 69.0 |
| Anti-ager, N-isopropyl-N'-phenyl-p-phenylenediamine | 1.2 | 1.2 |
| Anti-ager, phenyl-β-naphthylamine | 1.2 | 1.2 |
| Benzylthiazolyl-2-cyclohexyl-sulfenamide | 1.2 | 1.2 |
| Diphenyl guanidine | 3.15 | 2.8 |

-continued

|  | Mixture 1 Parts | Mixture 2 Parts |
|---|---|---|
| Tetramethyl thiurame monosulfide | — | 0.1 |
| Sulfur | 2.0 | 2.0 |
|  | 260.75 | 301.5 |

Both of these mixtures and their vulcanizates were compared with a conventional winter tire mixture "A" for a tread of a market tire of German production and with following black containing mixture "B" and their vulcanizates.

MIXTURE B

|  | Parts |
|---|---|
| Oil-extended styrene-butadiene rubber | 96.5 |
| cis-1,4-polybutadiene | 30.0 |
| ISAF-carbon black (Corax 6 of Degussa) | 75.0 |
| Zinc oxide | 4.0 |
| Stearic Acid | 1.2 |
| Highly aromatic hydrocarbon plasticizer oil | 15.0 |
| Anti-ager, N-isopropyl-N'-phenyl-p-phenylenediamine | 1.5 |
| Anti-ager, phenyl-β-naphthylamine | 1.5 |
| Benzythiazolyl-2-cyclohexyl-sulfenamide | 1.2 |
| Sulfur | 1.6 |
|  | 227.5 |

In the tests and the resulting test results the following abbreviations were used:

| Abbreviation | Designation | Measured In |
|---|---|---|
| $t_s$ | Mooney-scorch time | Minutes |
| $t_{35}$ | Mooney-cure time | Minutes |
| ML4 | Mooney plasticity at 100°C., standard rotor testing time 4 minutes |  |
| sp.grv. | Specific gravity | g/cm³ |
| VZ | Vulcanization time | Minutes |
| VT | Vulcanization temperature | °C. |
| AF | Tensile strength | kp/cm² |
| M300 | Modulus 300% | kp/cm² |
| BD | Elongation at break | % |
| bl.D. | Remaining elongation after break | % |
| E | Rebound | % |
| SH | Shore A - Hardness | — |
| EF | Resistance to tear propagation | kp/cm |
| A | Abrasion (also "DIN abrasion") | mm³ |
| ΔT | Temperature increase (see Goodrich Flexometer) | °C. |

TESTING STANDARDS

The physical tests were carried out at room temperature according to the following standard specifications.

(DIN = German Industrial Standard)

| | |
|---|---|
| Tensile strength, elongation at break and stretching value on 6 mm large rings | DIN 53504 |
| Tear propagation resistance | DIN 53507 |
| Rebound | DIN 53512 |
| Shore A hardness | DIN 53505 |
| Specific gravity | DIN 53550 |
| Mooney Test | DIN 53524 |
| Goodrich-Flexometer (Determination of the heat build up, ΔT) | ASTM D 623-62 |
| Abrasion | DIN 53516 |

The vulcanizates were always produced in a steam heated multiple plate press at the stated vulcanization temperatures.

PROPERTIES OF THE UNVULCANIZED MIXTURES

| Mixture | A | B | 1 | 2 |
|---|---|---|---|---|
| $t_5$ (130°C) | 18.5 | 29.6 | 15.4 | 14.0 |
| $t_{35}$ | 22.2 | 33.3 | 20.1 | 17.4 |
| ML4 | 60.0 | 64.0 | 60.0 | 67.0 |
| Sp.grv. | 1.16 | 1.15 | 1.21 | 1.23 |

PROPERTIES OF THE UNVULCANIZED MIXTURES

The vulcanization took place at 160°C.

| Mixture | A | | B | | 1 | | 2 | |
|---|---|---|---|---|---|---|---|---|
| VZ | 20 | 40 | 20 | 40 | 20 | 40 | 20 | 40 |
| ZF | 160 | 166 | 169 | 169 | 162 | 151 | 121 | 113 |
| M300 | 71 | 65 | 56 | 56 | 57 | 56 | 42 | 43 |
| BD | 555 | 620 | 658 | 690 | 653 | 615 | 715 | 677 |
| bl.D. | — | — | 24 | 23 | 35 | 28 | 50 | 40 |
| E | 29 | 29 | 28 | 27 | 35 | 35 | 24 | 25 |
| SH | 59 | 58 | 56 | 56 | 67 | 67 | 67 | 70 |
| EF | 21 | 19 | 13 | 14 | 30 | 27 | 28 | 27 |
| A | 66 | — | 86 | — | 74 | — | 111 | — |

Goodrich-Flexometer-Tests

Vulcanization Temperature 160°C. Vulcanization Time 40 Minutes.

| | |
|---|---|
| Stroke | 0.250 |
| Frequency | 30 Hz |
| Specific load | 11 kg |
| Measuring Temperature | Room temperature |
| Running Time | 25 minutes |

| Mixture | T in °C | Static Compression in % | Dynamic Compression in % | Compression Set in % |
|---|---|---|---|---|
| A | 136 | 14.6 | 36.0 | 25.8 |
| B | 149 | 16.1 | 36.2 | 27.3 |
| C | 79 | 15.4 | 32.0 | 25.9 |
| D | 87 | 19.4 | 37.5 | 34.2 |

Secondly in the braking test carried out at a starting speed of 30 kilometers per hour the distance to complete stopping was measured (braking retardation by braking distance measurement in meters).

Thirdly, the acceleration test took place by travelling a measured stretch of 22 meters from a standing start with the highest possible acceleration (time measured in seconds and the final speed measured after 25 meters). The artificial ice had a surface temperature of 0° to −3.5°C. The air temperature at 0.8 meters above the ice upper surface was +2 to +4°C.

The testing of the tires on a wet roadway took place on a watered asphalt circular road. At an effective diameter of 67 meters there were travelled four measured rounds in each test. The travel time in seconds was measured with the help of a light barrier. In the braking tests on a wet roading travelling was at a starting speed of 50 kilometers/hour or 80 kilometers/hour and then complete stopping was measured on the watered rough asphalt road. The braking distance in meters was measured and the average retardation determined.

The temperature of the road on the upper surface was 11° to 20°C. and the air temperature 9° to 19°C.

From all the measured values there were calculated average acceleration, circular acceleration or retardation values and from these the $\mu$ value (also called coefficient of function). For evaluation there was always set as equal to 100 the coefficient of friction (as average) for tires of mixture A. From the remaining coefficient of frictions the following evaluations were obtained.

From the values there are derived the following results.

The specified coefficient of friction or $\mu$ values in percent of the skid tests on ice for the tires produced

TEST

| Mixture | On Ice | | | On Wet Roadway | |
|---|---|---|---|---|---|
| | Circular Road | Braking | Acceleration | Circular Road | Braking |
| A | 100 | 100 | 100 | 100 | 100 |
| B | 95 | 95 | 96 | 100 | 104 |
| 1 | 110 | 116 | 105 | 95 | 94 |
| 2 | 129 | 121 | 121 | 98 | 95 |

From the four mixtures (1 and 2 according to the invention, A and B according to the state of the art) there were prepared treads and in turn tires prepared. These tires were then tested on a passenger car on the ice of an artificially iced road as well as on the wet track of a street provided with a rough asphalt coat and the results compared with each other. The tests took place with the same car. The tires tested all had the same pattern. They were first used on a circular road having an effective diameter of 20 meters (circular road test, 4 measuring rounds, travel time measured).

from mixtures of the invention showed considerable improvement in the resistance to skidding on ice. The observed increase of skid resistance on ice was repeatedly found to be well reproducible. These types of good values of skid resistance on ice were not previously known. There was found therewith a tread quality which is capable of replacing the presently produced and used studded tires with equally favorable properties on ice.

The passenger automobile winter tires referred to for the comparison tests were produced for several years in Germany and are obtainable in commerce. They possess a tread quality (mixture A) designated as very good. This mixture A was specially developed for tires having favorable skid properties on ice with a calibrated ratio of ice and wet skid resistance. In order to make a comparison with a carbon black filler containing composition in addition to mixture A there was made the comparison with the carbon black containing tread mixture B as representative of a composition which at present is frequently customary in the production of passenger automobile tires. These mixture B tires in their skid properties on ice are about as unfavorable as the mixture A tires. In contrast to the mixture A, tires prepared according to the invention have an improvement in ice skid properties of 30%. This can only be obtained by the compositions of the invention.

EXAMPLE 2

Another mixture according to the invention had the following composition:

| MIXTURE 3 | Parts by weight |
| --- | --- |
| Natural Rubber ML 4 approx. 40 | 30 |
| cis-1,4-Polybutadien (98 % cis-1,4) | 70 |
| Precipitated active silica having a specific surface area measured according to BET of 200 m²/g and an average primary particle size of 18 millimicrons (Ultrasil VN 3 of Degussa) | 103 |
| HAF improved (Corax 4 of Degussa) | 5 |
| Bis-(3,3'-triethoxysilylpropyl)-tetrasulfide | 8 |
| Zinc oxide | 4 |
| Stearic acid | 1 |
| Naphthenic hydrocarbon plasticizer oil (setting point −28°C) | 70 |
| Anti-ager, N-isopropyl-N'-phenyl-p-phenylenediamine | 1,5 |
| Anti-ager, phenyl-β-naphthylamine | 1,5 |
| Diphenyl guanidine | 3,5 |
| Bis-(2-ethylamino-4-diethylamino-triazine-6-yl)-disulphide | 2 |
| Sulfur | 2 |
|  | 301,5 |
| $t_s$ (130°C) | 11,4 |
| $t_{35}$ (130°C) | 15,5 |
| ML 4 | 51 |
| spec. gravity | 1,18 |

Properties of the vulcanized Mixture

The vulcanisation took place at 150°C/20'

| Tensile Strength | kp/cm² | 133 |
| --- | --- | --- |
| Modulus 300 | kp/cm² | 62 |
| Elongation at Break | % | 577 |
| Perm. Set after Break | % | 35 |
| Resilience | % | 34 |
| Shore-Hardness | — | 68 |
| Tear Resistance | kp/cm | 31 |
| Abrasion | mm³ | 61 |

Skid-test against Mixture 2

| Mixture | On Ice Circular Road | Braking | On Wet Roadway Braking |
| --- | --- | --- | --- |
| 2 (of exempl.1) | 100 | 100 | 100 |
| 3 | 98 | 94 | 99 |

EXAMPLE 3

Another mixture according to the invention had the following composition:

| MIXTURE 4 | Parts by weight |
| --- | --- |
| Natural Rubber ML 4 approx. 40 | 30 |
| cis-1,4-Polybutadien (98 % cis-1,4) | 70 |
| Precipitated active silica having a specific surface area measured according to BET of 200 m²/g and an average primary particle size of 18 millimicrons (Ultrasil VN 3 of Degussa) | 60 |
| ISAF improved (Corax 7 of Degussa) | 60 |
| Bis-(3,3'-triethoxysilylpropyl)-tetrasulfide | 2,5 |
| Zinc oxide | 4 |
| Stearic acid | 1 |
| Naphthenic hydrocarbon plasticizer oil (setting point −28°C) | 72 |
| Anti-ager, N-isopropyl-N'-phenyl-p-phenylenediamine | 1,5 |
| Anti-ager, phenyl-β-naphthylamine | 1,5 |
| Diphenyl guanidine | 1,5 |
| Bis-(2-ethylamino-4-diethylamino-triazine-6-yl)disulphide | 2 |
| Sulfur | 2 |
|  | 308,0 |
| $t_s$ (130°C) | 21,2 |
| $t_{35}$ (130°C) | 26,0 |
| ML 4 | 74 |
| spec. gravity | 1,17 |

Properties of the vulcanized Mixture

The vulcanisation took place at 160°C/20'

| Tensile Strength | kp/cm² | 80 |
| --- | --- | --- |
| Modulus 300 | kp/cm² | 48 |
| Elongation at Break | % | 450 |
| Perm. Set after Break | % | 32 |
| Resilience | % | 24 |
| Shore-Hardness | — | 65 |
| Tear Resistance | kp/cm | 15 |
| Abrasion | mm³ | 76 |

Skid-test against Mixture A and B (Mixtures A and B being conventional mixtures for the production of winter tires containing carbonblack as the only filler.

| Mixture | On Ice Circular Road | Braking | On Wet Roadway Braking |
| --- | --- | --- | --- |
| A | 100 | 100 | 100 |
| B | 100 | 96 | 100 |
| 4 | 115 | 116 | 102 |

What is claimed is:

1. A vulcanizable rubber mixture suitable for skid resistant tire treads comprising (1) a rubber, 20 to 100% of the total rubber being polybutadiene rubber and 80 to 0% of the rubber being a sulfur vulcanizable synthetic rubber other than polybutadiene or being natural rubber, (2) silica filler in an amount of 20 to 200 parts by weight per 100 parts of rubber with the proviso that if carbon black is also present the amount of silica is 40 to 200 parts by weight per 100 parts of rubber, (3) plasticizer oil in an amount of 40 to 100 parts by weight per 100 parts of rubber, (4) sulfur or a sulfur donor in an amount of 0.2 to 8 parts by weight per 100 parts of rubber, (5) an accelerator in an amount of 0.1 to 8 parts by weight per 100 parts of rubber, and (6) 0.1 to 25 parts by weight per 100 parts of rubber of a sulfur containing organosilane having the formula Z—alk—$S_n$—alk—Z in which

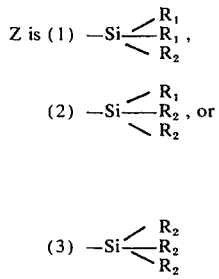

in which $R_1$ is alkyl of 1 to 4 carbon atoms, cycloalkyl of 5 to 8 carbon atoms or phenyl, $R_2$ is alkoxy of 1 to 8 carbon atoms or cycloalkoxy of 5 to 8 carbon atoms, alk is a divalent hydrocarbon group of 1 to 8 carbon atoms, and n is a number of 2 to 6.

2. The mixture of claim 1 wherein said polybutadiene is 30 to 90% of the total rubber the balance being a different sulfur vulcanizable rubber.

3. The mixture of claim 2 wherein said different sulfur vulcanizable rubber is a polymer of a conjugated diene.

4. The mixture of claim 3 wherein the different sulfur vulcanizable rubber is natural rubber, polyisoprene, butadiene-styrene copolymer, butadiene-acrylonitrile copolymer, polychlorobutadiene, butyl rubber, chlorobutyl rubber, bromo-butyl rubber or ethylene porpylene non conjugated polyene terpolymer.

5. The mixture of claim 1 wherein $n$ is about 2.8 to 4.2.

6. The mixture of claim 1 wherein Z is (3).

7. The mixture of claim 6 wherein $R_2$ is alkyl of 1 to 4 carbon atoms.

8. The mixture of claim 7 wherein the organosilane includes bis-(3,3'-triethoxysilylpropyl)tetrasulfide.

9. The mixture of claim 6 wherein the rubber is a mixture of 30 to 90% polybutadiene and 70 to 10% of butadiene-styrene copolymer.

10. The mixture of claim 9 wherein the rubber is a mixture of 50 to 85% of polybutadiene and 50 to 15% of butadiene-styrene copolymer, n is about 2.8 to 4.2 and $R_2$ is alkyl of 1 to 4 carbon atoms.

11. The mixture of claim 9 wherein the rubber is a mixture of 30 to 90% high cis'-1,4-polybutadiene and 70 to 10% of a Low Mooney-styrene-butadiene rubber.

12. The mixture of claim 1 wherein the rubber is a mixture of 30 to 90% polybutadiene and 70 to 10% of sytrenebutadiene copolymer.

13. The mixture of claim 1 wherein the rubber is a mixture of 30 to 90% polybutadiene and 70 to 10% of natural rubber.

14. The mixture of claim 1 also including 0.1 to 50 parts of carbon black per 100 parts of rubber.

15. The mixture of claim 1 wherein at least a part of the organosilane is present as a surface coating on the silica.

16. The mixture of claim 1 wherein the accelerator includes a sulfur containing triazine compound having the formula

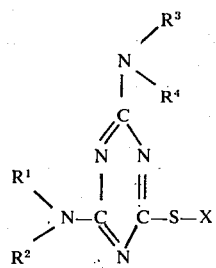

wherein $R^1$ and $R^3$ are each selected from the group consisting of hydrogen, alkyl, alkenyl, cycloalkyl, phenyl, aralkyl and substituted alkyl, alkenyl, cycloalkyl, phenyl and aralkyl wherein the substituents are selected from the group consisting of —OH, —OR and —CN, R being alkyl with up to 18 carbon atoms, $R^2$ and $R^4$ each selected from the group consisting of hydrogen, alkyl, alkenyl, cycloalkyl, phenyl, aralkyl and substituted alkyl, alkenyl, cycloalkyl, phenyl and aralkyl wherein the substituents are selected from the group consisting of —OH, —OR, and —CN, R being alkyl with up to 18 carbon atoms, X is selected from the group consisting of hydrogen,

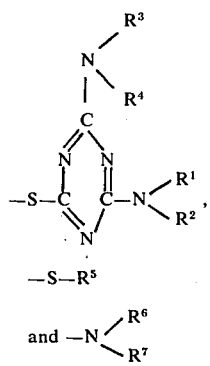

$R^6$ being selected from the group consisting of hydrogen, alkyl, aralkyl and cycloalkyl and $R^7$ being selected from the group consisting of alkyl, aralkyl and cycloalkyl and wherein $R^6$ and $R^7$ together may also form a cycloaliphatic ring having from 5 to 7 carbon atoms in the ring and from 5 to 10 carbon atoms, including lower alkyl, attached to the ring or wherein $R^6$ and $R^7$ may be linked by a member of the group consisting of —O—, —S— and

and wherein the number of carbon atoms in $R^1$, $R^2$, $R^3$, $R^4$, $R^6$ and $R^7$ is as follows:

| | |
|---|---|
| alkyl | up to 18 carbon atoms |
| alkenyl | up to 6 carbon atoms |
| cycloalkyl | from 5 to 7 carbon atoms |
| aralkyl | from 7 to 9 carbon atoms. |

17. The mixture of claim 16 wherein X is formula III.

18. The mixture of claim 17 wherein the triazine is bis(2-ethylamino-4-diethyl-amino-triazinyl-6)-disulfide.

19. The mixture of claim 1 wherein the plasticizer oil is a naphthenic oil having a setting point of 0° to −60°C.

20. The mixture of claim 19 wherein the naphthenic oil is present in an amount of 50 to 80 parts per 100 parts of rubber.

21. The mixture of claim 20 wherein the rubber is a mixture of 50 to 85% polybutadiene and 50 to 15% of butadiene-styrene copolymer, the organosilane is present in an amount of 1 to 15 parts per 100 parts of rubber.

22. The mixture of claim 1 wherein 0.2 to 8 parts of basic activator is present per 100 parts of rubber.

23. A tire tread comprising the vulcanized mixture of claim 1.

* * * * *